United States Patent [19]

Ishii

[11] 4,394,721

[45] Jul. 19, 1983

[54] THYRISTOR POWER CONVERTER WITH SWITCHED IMPEDANCE

[75] Inventor: Toshiaki Ishii, Inazawa, Japan

[73] Assignee: Mitsubishi Denki Kabushiki Kaisha, Tokyo, Japan

[21] Appl. No.: 272,849

[22] Filed: Jun. 12, 1981

[30] Foreign Application Priority Data

Nov. 4, 1980 [JP] Japan .............................. 55/154985

[51] Int. Cl.³ .............................................. H02M 1/12
[52] U.S. Cl. .................................. 363/44; 318/345 C; 363/129
[58] Field of Search ........................ 363/44, 45, 54, 87, 363/128, 63, 129; 323/207–211; 318/345 C

[56] References Cited

U.S. PATENT DOCUMENTS 4,288,729 9/1981 Anzai et al. ...................... 318/345 C Primary Examiner—William H. Beha, Jr.
Attorney, Agent, or Firm—Sughrue, Mion, Zinn, Macpeak and Seas

[57] ABSTRACT

An ac to dc power conversion apparatus employing commutated thyristors has a series circuit comprising a capacitor 8 and an impedance element 9 connected at the input side of a thyristor conversion unit 4. The capacitor reduces notch voltages generated during the commutation of the thyristors, and the impedance element prevents the capacitor from resonating with other inductive reactances in the circuit. A switching device 10 is connected in parallel with the impedance element, and is closed during the commutation of the thyristors to maximize the notch voltage reduction.

6 Claims, 13 Drawing Figures

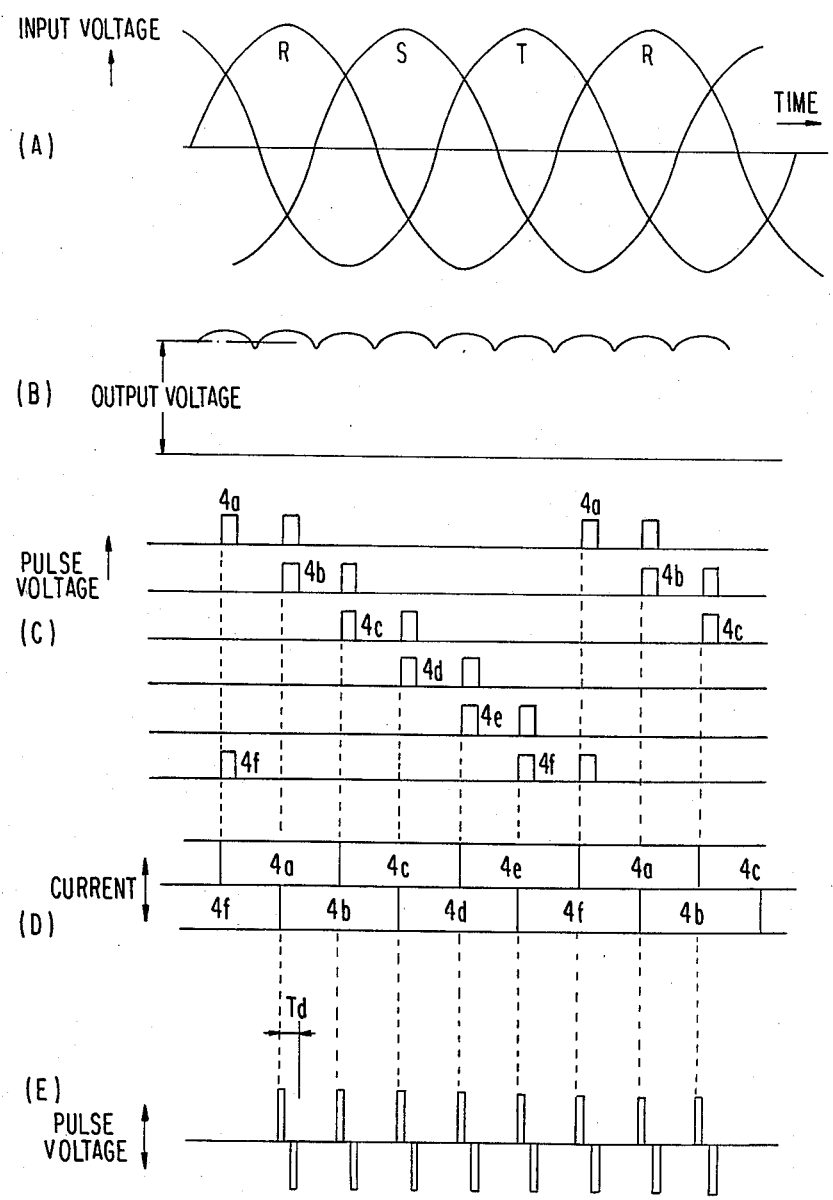

THYRISTOR POWER CONVERTER WITH SWITCHED IMPEDANCE

BACKGROUND OF THE INVENTION

1. Field of the Invention

This invention relates to a thyristor ac to dc power converter.

2. Description of the Prior Art

Thyristor power converters have been used in recent years for implementing speed control in dc electric motors. One form of such a converter is a static Ward Leonard speed control system as shown in FIG. 1 of the accompanying drawings, wherein reference numeral 1 designates a three-phase transformer serving as a 50/60 Hz power supply. R, S, and T are the Wye connected secondary windings of the transformer, 2 designates internal power supply reactances each having a value of $L_1$, 3 designates ac control system reactors each having a value of $L_2$, and 4 is a power conversion unit comprising thyristors 4a-4f. Reference numeral 6 designates a dc motor armature having a series input impedance 5, and 7 is a field coil. Two sets of forward and reverse oriented thyristor units 4 are normally used; only one set is shown in FIG. 1 for clarity. Since this circuit arrangement is well known in the art, no description of its operation will be given.

FIG. 2 shows the waveform of a phase voltage at imaginary line A—A at the input of the thyristor unit 4. Reference character T denotes an interval of time (in general about 0.1 m sec) which corresponds to the commutation overlap angle. The depth of the undesired voltage notch produced during each commutation or thyristor triggering sequence is a function of the values of the reactances $L_1$ and $L_2$, and can be expressed by the following equation:

$$\frac{E_1}{E_0} = \frac{L_2}{L_1 + L_2}.$$

where
$E_0$ = the maximum voltage, and
$E_1$ = the notch voltage.

When power is supplied from an emergency generator having a relatively high reactance value $L_1$, as during a power failure, the voltage $E_1$ becomes small and hence the voltage notch is considerably deepened. The IEEE Guide for Harmonic Control and Reactive Compensation of Static Power Converters, January 1979, discusses notch voltage characteristics in detail, and this paper is incorporated herein by reference.

If a component such as a unijunction transistor is connected to the circuit at line A—A, the voltage notches are liable to cause malfunctioning since unijunction transistors are very susceptible to abrupt voltage drops.

From the foregoing equation it may be easily seen that the depth of the voltage notches may be reduced by increasing the value of the reactance $L_2$. The larger the reactance $L_2$, however, the greater the size of the ac reactors 3. The results in an increased commutation overlap angle and an associated increase in the time interval T, which leads to commutation failures in the thyristors 4a-4f.

One prior art approach to solving the notch problem is shown in FIG. 3, wherein a grounded capacitor 8 is connected at the input of the power conversion unit 4. While the capacitor 8 acts to eliminate the voltage notches, it also gives rise to resonances by coaction with the reactances $L_1$, $L_2$, causing the voltage waveform to become rippled as illustrated in FIG. 4. Such ripples adversely affect other circuit elements and components connected at line A—A. The capacitor 8 is also easily overloaded by harmonic current components fed back from the thyristor conversion unit 4. To prevent such overloading or to remove the ripples from the voltage waveform, a reactor may be connected in series with the capacitor 8. With such an expedient, however, the voltage notches are again increased.

SUMMARY OF THE INVENTION

It is an object of this invention to provide an improved thyristor power conversion apparatus having a capacitor connected at its input, and incorporating means for preventing the capacitor from being overloaded and for reducing ripples in the voltage waveform.

This object is attained by connecting an impedance element in series with each input capacitor, and connecting a switching element in parallel with each impedance element. Each switching element is closed during the commutation of the thyristors, to thereby shunt or bypass its associated impedance element.

BRIEF DESCRIPTION OF THE DRAWINGS

In the drawings:

FIGS. 8A through 8E show waveform diagrams of various signals appearing in the apparatus of FIG. 7.

DETAILED DESCRIPTION OF THE PREFERRED EMBODIMENTS

The present invention will now be described with reference to FIGS. 5-8, which illustrate the application thereof to an elevator lifting motor. The general principles of the invention will first be described in conjunction with FIGS. 5 and 6.

Figure 1:
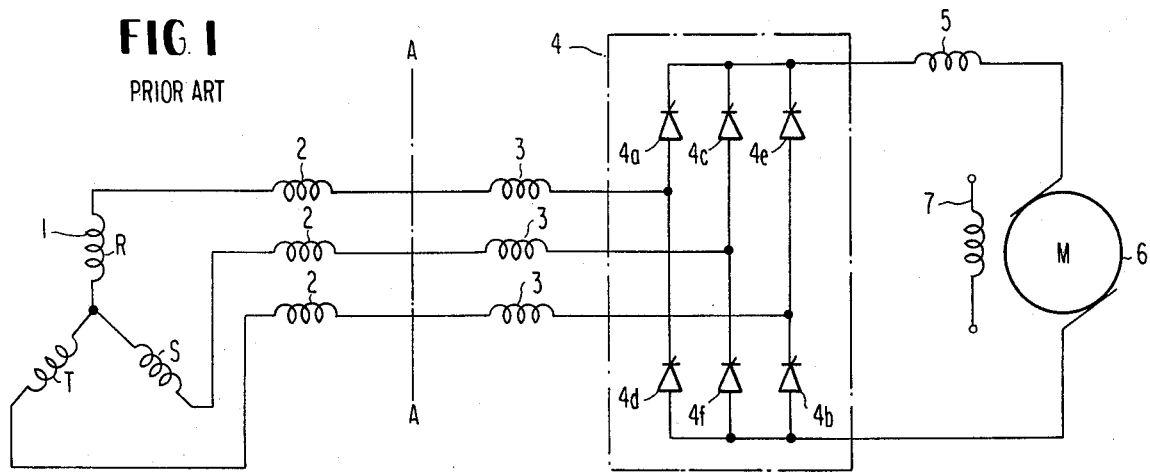
FIG. 1 shows a schematic circuit diagram of a conventional control apparatus for a dc motor.
Figure 2:
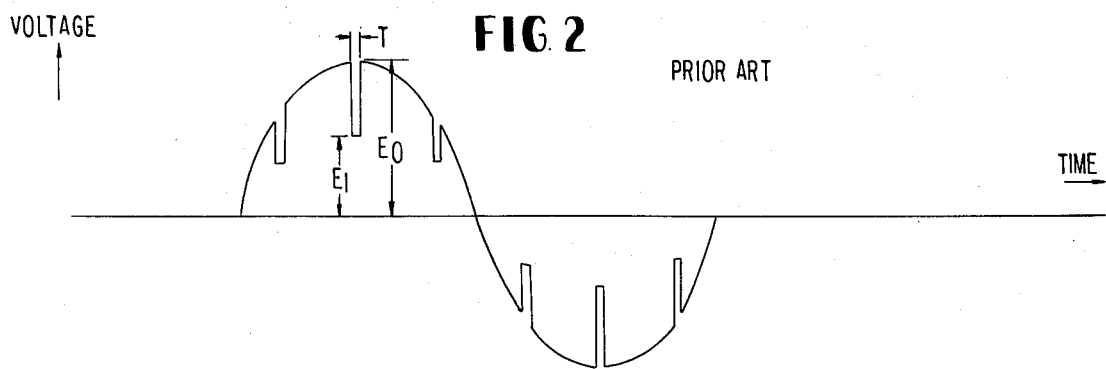
FIG. 2 shows a waveform diagram of an input voltage at line A—A in FIG. 1.
Figure 3:
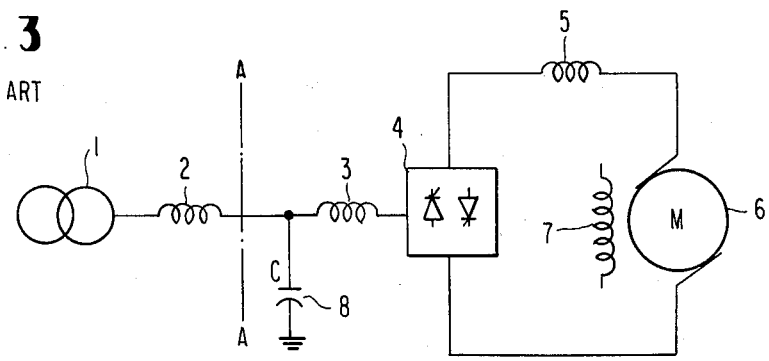
FIG. 3 shows a schematic circuit diagram of an improved conventional control apparatus shown in FIG. 1.
Figure 4:
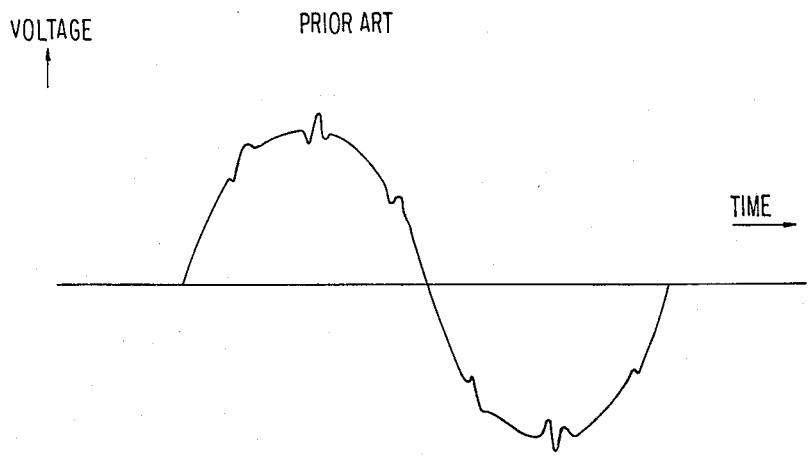
FIG. 4 shows a waveform diagram of an input voltage at line A—A in FIG. 3.
Figure 5:
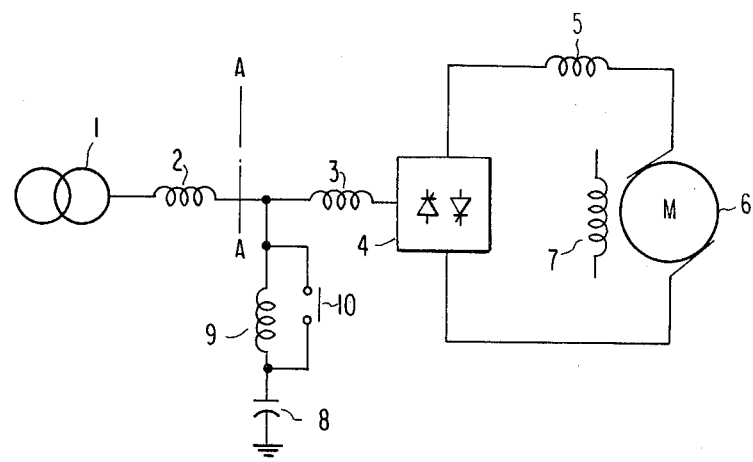
FIG. 5 shows a schematic circuit diagram of a power conversion thyristor device according to the present invention.
Figure 6:
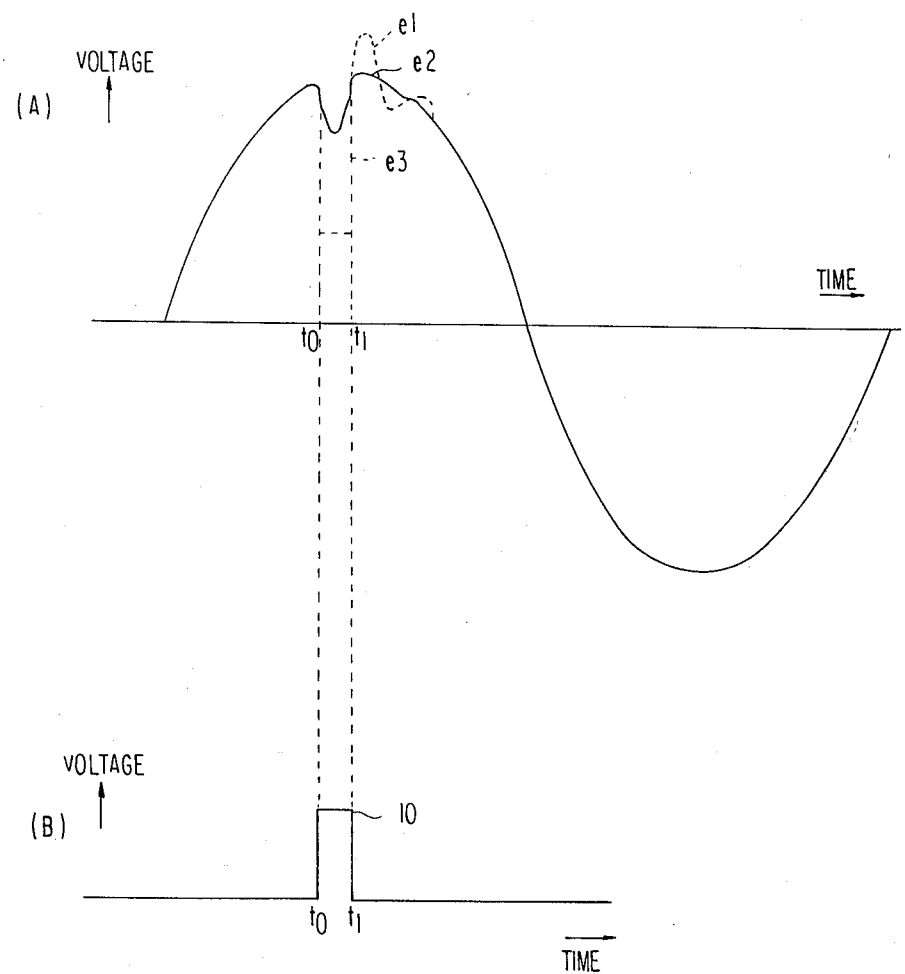
FIGS. 6A and 6B show a waveform diagram of an input voltage for the apparatus of FIG. 5, and a control pulse for a switching element thereof, respectively.

An impedance element 9, such as a reactor or resistor, is connected in series between the input of the thyristor conversion unit 4 and the capacitor 8; the value of the latter is selected in accordance with the parameters of the conversion unit 4. A switching element 10 is connected across the impedance element 9. In FIG. 6 $e_1$ is the waveform of a rippled voltage, $e_2$ is the waveform of an unrippled voltage, and $e_3$ is the waveform of a voltage notch which would be developed if there were no capacitor 8. The thyristor conversion unit 4 starts commutation at time $t_0$ and the switching element 10 is then closed to shunt the impedance element 9; the commutation ends and the switching element 10 is opened at time $t_1$.

The switching element 10 remains open until the thyristor conversion unit 4 starts commutation again, and the impedance element 9 is included in series with the capacitor 8 during this period. The rippled voltage waveform $e_1$ developed due to resonance is thus reduced to the voltage waveform $e_2$, and the capacitor 8 is prevented from becoming overloaded. When the switching element 10 is closed at time $t_0$ the impedance element 9 is shunted to thereby eliminate the voltage notch $e_3$. The switching element 10 is opened again at time $t_1$.

In general, when an apparatus having a thyristor conversion unit 4 employs a power factor correction capacitor (5 KVA–20 KVA) to compensate for the delayed power factor of the conversion unit, it is advantageous to make good use of the correction capacitor for the capacitor 8. Since such a phase advance correction capacitor has a serially connected reactor therein, and its impedance is generally selected at 6% of the impedance of the capacitor, in many cases each reactor may be used for the impedance element 9.

Figure 7:
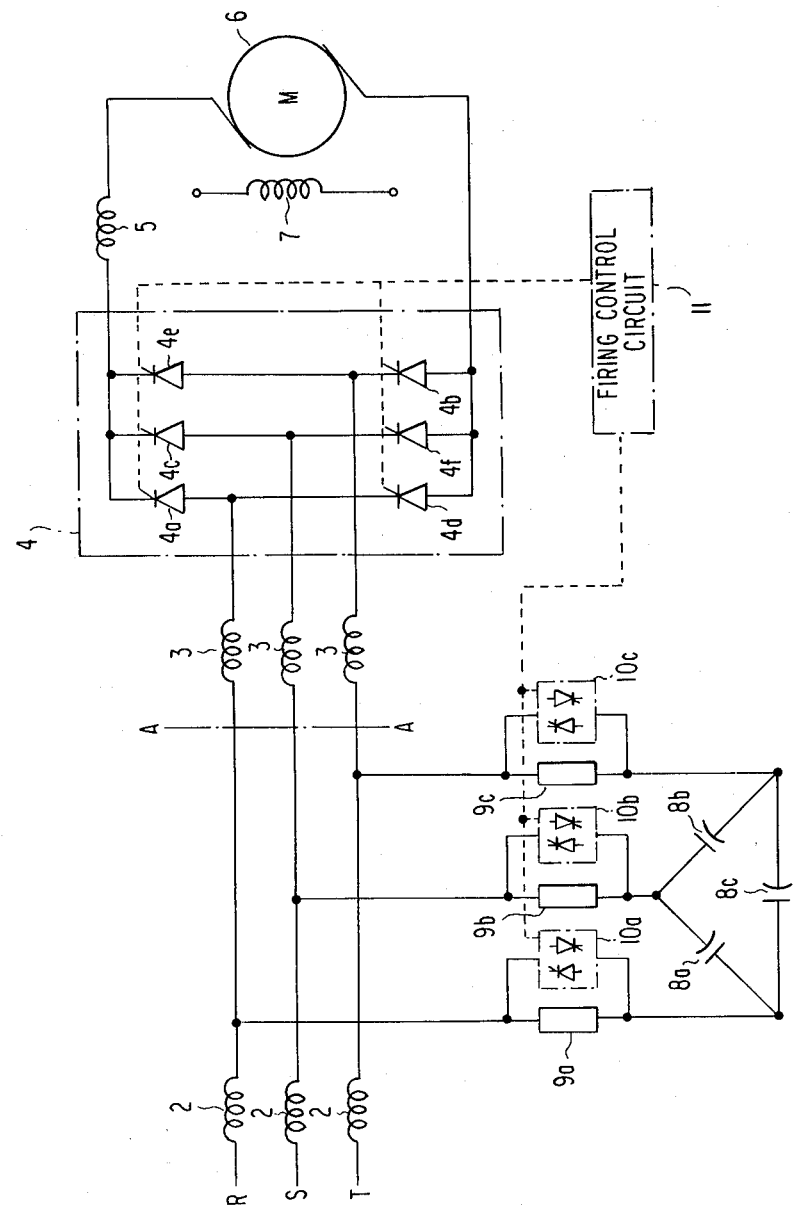
FIG. 7 shows a more detailed schematic circuit diagram of a thyristor power conversion apparatus according to the present invention.

In the more practical embodiment shown in FIGS. 7 and 8 delta connected capacitors 8a–8c are coupled to the conversion unit input through impedance elements 9a–9c shunted by gate-turnoff thyristors 10a–10c controlled by firing circuit 11. To cite one example of the value of these components, if the voltage of the 50 Hz power supply 1 is 440 V, the value of each reactor 3 is 30 mohm, and the value of each power supply reactance 2 is 15 mohm, then the value of each capacitor 8a–8c is selected at $$Q = 15 \text{KVA} \left[ Q = 2 \text{fcV}^2; c = \frac{15 \times 10^3}{2 \times 50 \times 440^2} = 250 \, \mu\text{F} \right],$$

and the value of each impedance element 9a–9c is selected at $X_L=6\%$ of the impedance $X_C$ of a capacitor 8a–8c $[X_L=(V^2/Q)\times 0.06=0.77 \text{ ohm}]$.

FIG. 8A shows the ac input voltages for the thyristor conversion unit 4, FIG. 8B shows the dc output voltage generated by the conversion unit during three-phase, full-wave rectification, FIG. 8C shows the firing pulse voltages applied by the firing circuit 11 to the thyristors 4a–4f, FIG. 8D shows the time intervals during which the thyristors are conductive, and FIG. 8E shows the firing pulse voltages applied by the firing circuit 11 to the gate-turnoff thyristors 10a–10c. The thyristors are rendered conductive to the application of a positive pulse to their gates, and are rendered non-conductive in response to the application of a negative pulse to their gates.

While the conversion unit thyristors 4a–4f are conductive and the gate-turnoff 10a–10c are deenergized with the impedance elements 9a–9c included in series with the capacitors 8a–8c, the application of a firing pulse to thyristor 4b as shown in FIG. 8C causes positive pulses to be applied to the thyristor 10a–10c, as illustrated in FIG. 8E, which are thereby rendered conductive to shunt the impedance elements 9a–9c. As also shown in FIG. 8E, negative pulses are applied a given period of time Td after the positive pulses, thus rendering the gate-turnoff thyristors 10a–10c non-conductive and including the impedance elements 9a–9c in the circuit again. The time interval Td is determined by the period of time during which the thyristors 4a–4f effect commutation. The gate-turnoff thyristors 10a–10c may obviously be replaced with transistors.

The firing pulses for the gate-turnoff thyristors 10a–10c may be generated earlier than the firing pulses for the thyristor conversion unit 4 by an interval equal to the switching time of the gate-turnoff thyristors.

Where a plurality of thyristor conversion units 4 are employed, the present invention may be adapted thereto by controlling the gate-turnoff thyristors 10a–10c with OR signals derived from the firing signals for the converter thyristors.

While in the illustrated embodiment the present invention has been shown as applied to a static Ward Leonard speed control system, the invention is also applicable to other devices equipped with thyristors which generate undesired voltage notches during commutation, such as variable voltage or variable frequency motor controls.

What is claimed is:

1. A thyristor power conversion apparatus for converting ac power to dc power by thyristor commutation, comprising:
   (a) an ac power supply (1) having an internal reactance (2),
   (b) thyristor means (4) for converting ac power to dc power, and having a reactance component (3) on an input side thereof,
   (c) capacitor means (8) connected to said input side of said thyristor means,
   (d) impedance element means (9) connected in series with said capacitor means,
   (e) switching means (10) connected in parallel with said impedance means, and
   (f) firing circuit means (11) for generating;
      (1) firing signals to commutate said thyristor means, and
      (2) switching signals to close said switching means only during the commutation of said thyristor means.

2. An apparatus as defined in claim 1, wherein the value of said capacitor means is selected in dependence upon the parameters of said thyristor means.

3. An apparatus as defined in claim 1, wherein said impedance element means is a resistor.

4. An apparatus as defined in claims 1, wherein said switching signals are synchronized with said firing signals for said thyristor means.

5. An apparatus as defined in claim 1, wherein said switching means is a gate-turnoff thyristor.

6. An apparatus as defined in claims 1, wherein said capacitor means is connected in shunt to the input side of said thyristor means.

* * * * *